Figure 13:
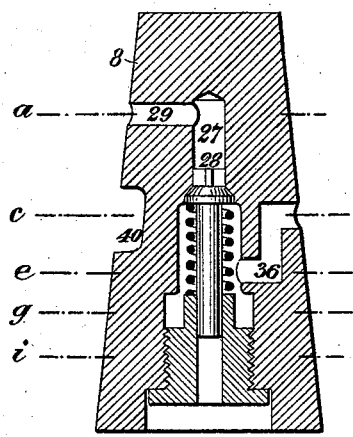

(No Model.) 5 Sheets—Sheet 1.
E. G. SHORTT.
ENGINEER'S VALVE MECHANISM FOR AIR BRAKES.
No. 538,550. Patented Apr. 30, 1895.
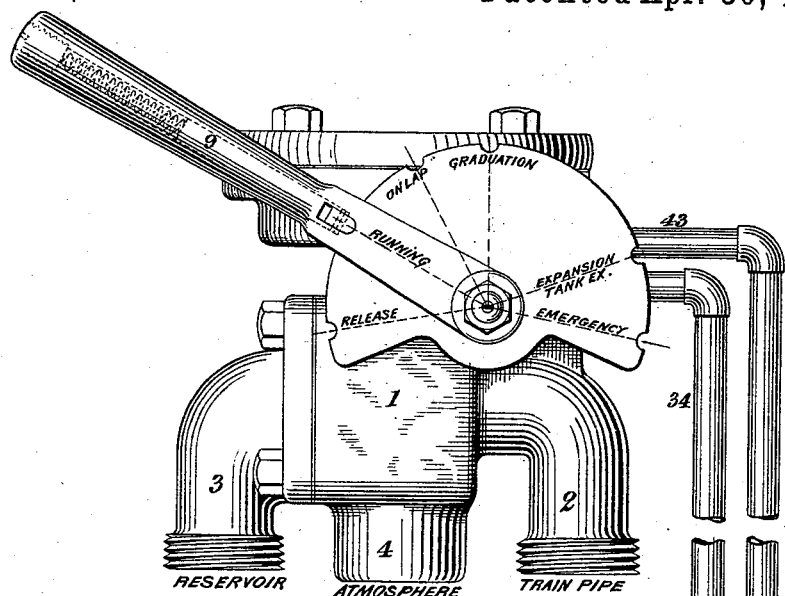
Fig. 1
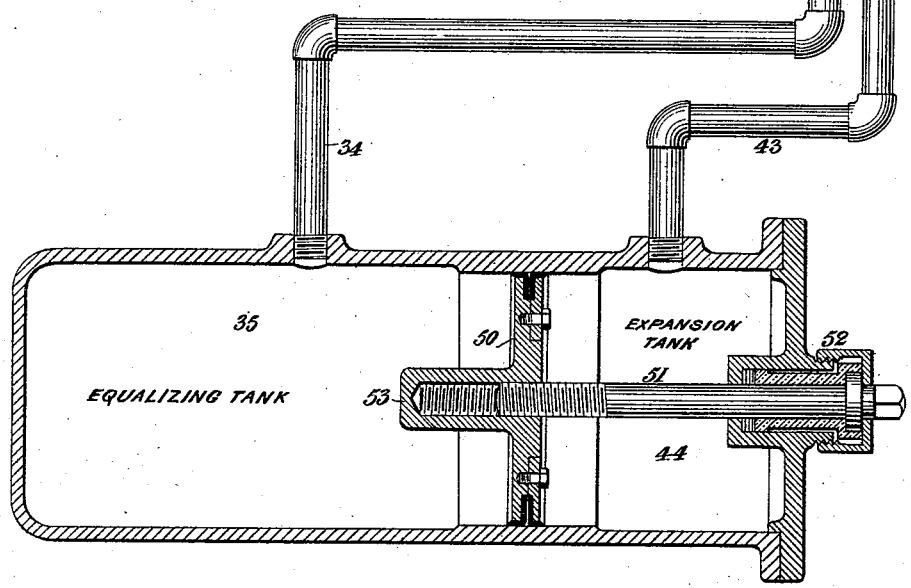
Witnesses:
Raphaël Netter
Robt. F. Gaylord
Inventor
Edward G. Shortt
by Duncan & Ross
Attorneys (No Model.) 5 Sheets—Sheet 2.
E. G. SHORTT.
ENGINEER'S VALVE MECHANISM FOR AIR BRAKES.
No. 538,550. Patented Apr. 30, 1895.
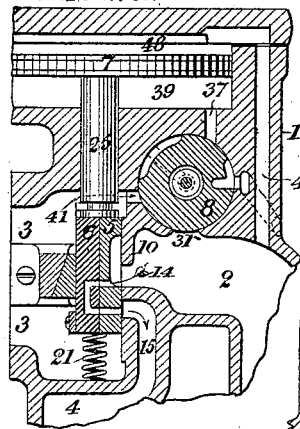
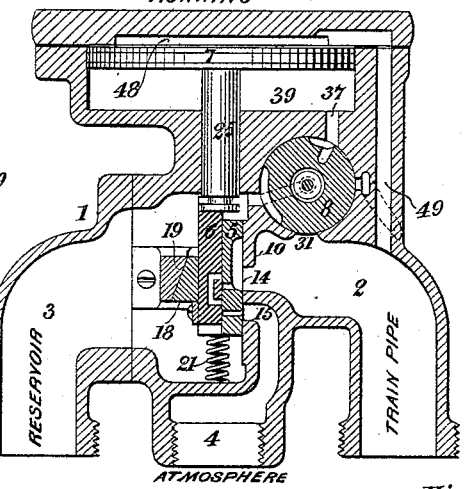
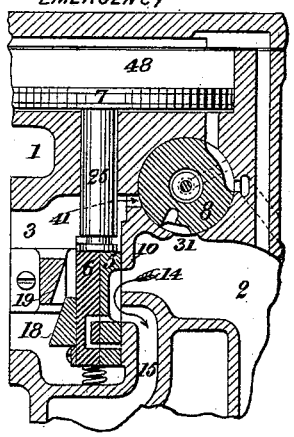
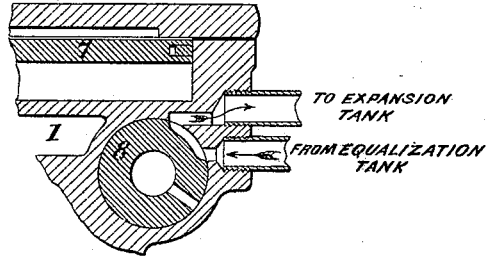
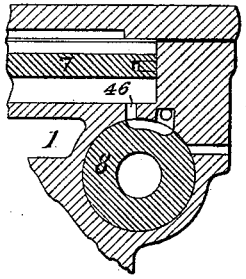
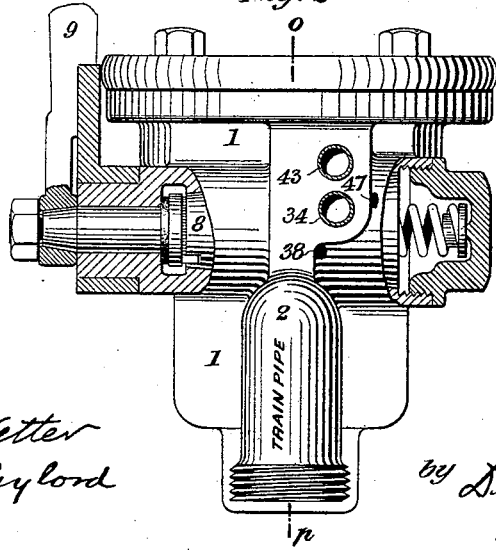

(No Model.)  5 Sheets—Sheet 3.
E. G. SHORTT.
ENGINEER'S VALVE MECHANISM FOR AIR BRAKES.
No. 538,550. Patented Apr. 30, 1895.
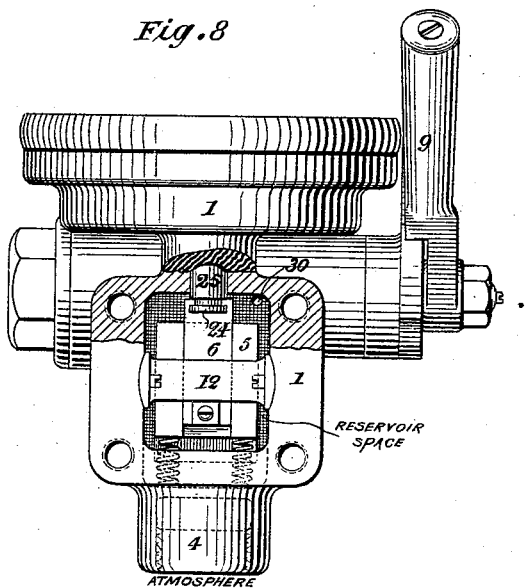
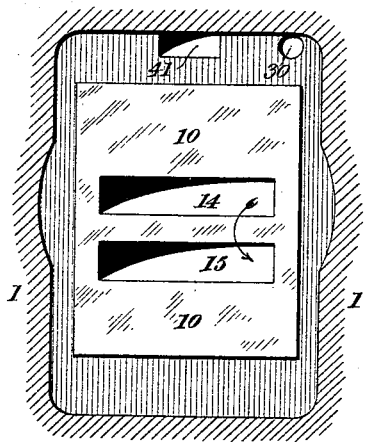
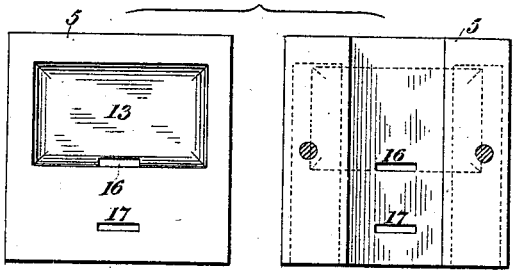
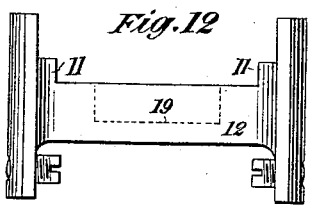
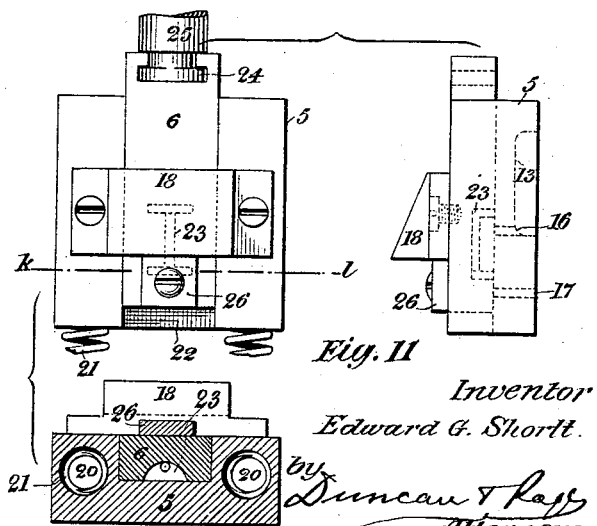
Witnesses:
Raphaël Netter
Robt. F. Gaylord
Inventor
Edward G. Shortt.
by Duncan & Raff
Attorneys.

(No Model.) 5 Sheets—Sheet 4.
E. G. SHORTT.
ENGINEER'S VALVE MECHANISM FOR AIR BRAKES.
No. 538,550. Patented Apr. 30, 1895.

Witnesses:
Raphaël Netter
Robt. F. Gaylord

Inventor
Edward G. Shortt
Duncan & Roff
by Attorneys.

THE NORRIS PETERS CO., PHOTO-LITHO., WASHINGTON, D. C.

(No Model.) 5 Sheets—Sheet 5.

E. G. SHORTT.
ENGINEER'S VALVE MECHANISM FOR AIR BRAKES.

No. 538,550. Patented Apr. 30, 1895.

Witnesses:
Raphaël Netter
Robt. F. Gaylord

Inventor
Edward G. Shortt
by Duncan & Page
Attorneys.

UNITED STATES PATENT OFFICE.

EDWARD G. SHORTT, OF CARTHAGE, ASSIGNOR TO CHARLES GOODWIN EMERY, TRUSTEE, OF NEW YORK, N. Y.

ENGINEER'S VALVE MECHANISM FOR AIR-BRAKES.

SPECIFICATION forming part of Letters Patent No. 538,550, dated April 30, 1895.

Application filed November 27, 1894. Serial No. 530,090. (No model.)

*To all whom it may concern:*

Be it known that I, EDWARD G. SHORTT, of Carthage, in the county of Jefferson and State of New York, have invented certain new and useful Improvements in Engineers' Valve Mechanism for Air-Brakes, of which the following is a specification, reference being had to the accompanying drawings.

These improvements relate to an improved construction of engineer's valve mechanism for operating an automatic air brake mechanism, and to a new method of effecting a measured graduation exhaust from the train pipe of such a brake mechanism. As is well understood in the practical field of this art, the common engineer's valve mechanism is necessarily constructed so that considerable physical effort is required to manipulate it; also the hand operated part or parts thereof directly controls one or more of the other parts of the brake system connected to it; also its proper manipulation in certain cases is only to be determined by a gage or gages. Hence undue wear and uncertain or incomplete manipulation results, together with leakage which tends to false or poor action and loss of reservoir air and special cares are undesirably imposed upon the engineer.

It is the object of my invention to make such a valve mechanism automatic, so far as concerns the movement of the parts directly controlling or effecting the actions of plain graduation application, measured graduation application, emergency application and release.

The invention consists, generally, of a valve mechanism in which a graduation valve and emergency valve are mechanically disconnected from the main or hand-operated valve but are actuated by compressed air controlled by said hand-valve; also it consists of the method of effecting a measured graduation exhaust by expanding a portion of train pipe air into a chamber of fixed capacity and causing the expanded air to control the train pipe application reduction of pressure, and of mechanism for practicing this method.

Figure 14:
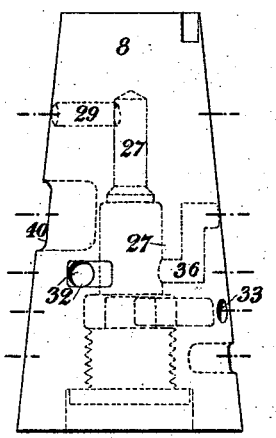
Figure 15:
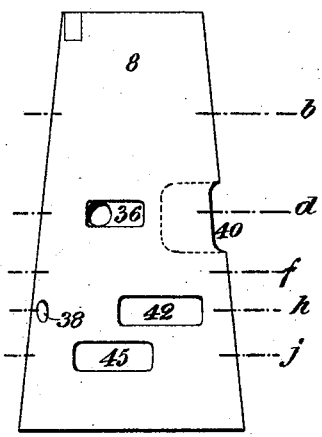
Figure 16:
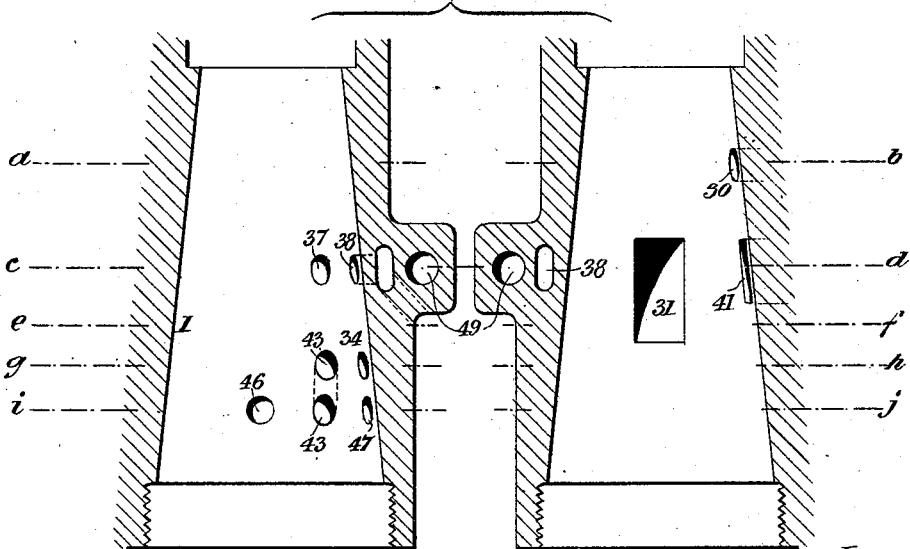
Figure 17:
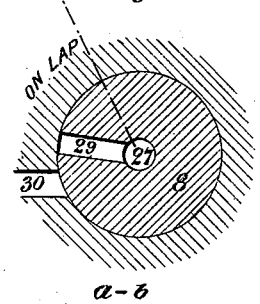
Figure 18:
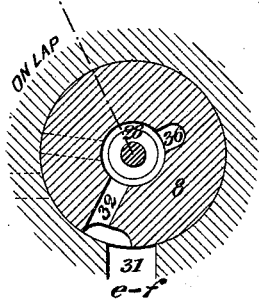
Figure 19:
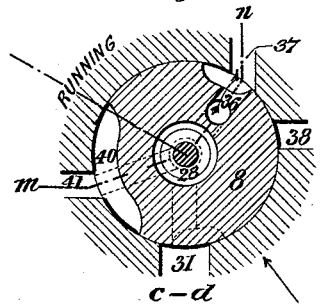
Figure 20:
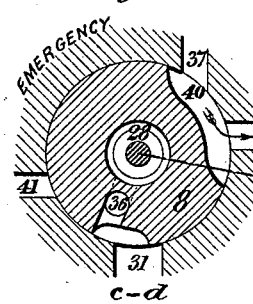
Figure 21:
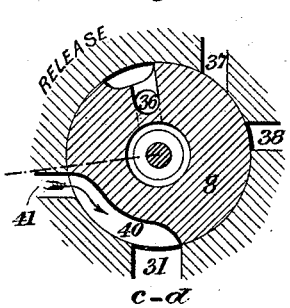
Figure 22:
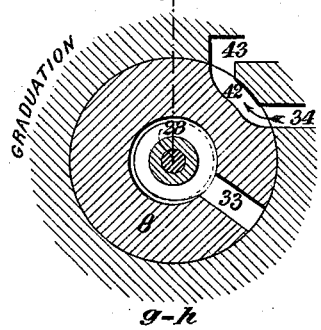
Figure 23:
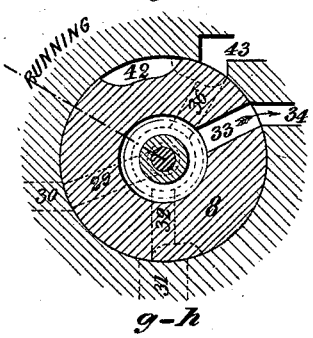
Figure 24:
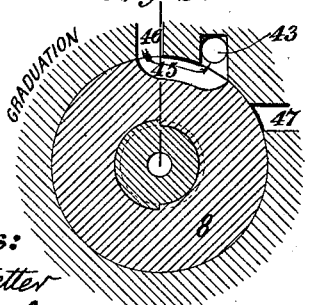
Figure 25:
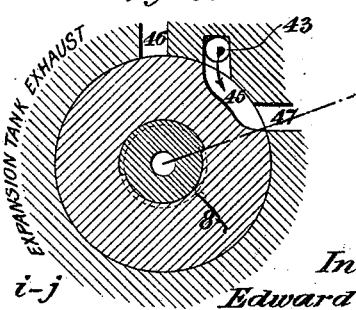

In the drawings, Figure 1 is a side elevation view of an engineer's valve mechanism and connected equalizing and expansion chambers or tanks embodying my invention. Fig. 2 is a like elevation of the same as seen from the right hand of Fig. 1, but with said tanks cut away. Fig. 3 is a vertical section of the same on plane *o p* of Fig. 2, looking from the left hand of Fig. 1 or on the planes *c d* of Figs. 13 to 16, the movable parts being in running position. Fig. 4 is a like view with said parts in graduation position. Fig. 5 is a like view with said parts in emergency position. Figs. 6 and 7 are similar sections in detail on planes *g h* and *i j* of Figs. 13 to 16, with the said parts in position of graduation. Fig. 8 is an elevation view of the engineer's valve from the left hand of Fig. 1, the reservoir pipe-coupling part of the casing being removed to expose the back or reservoir sides of the graduation and emergency valves. Fig. 9 is an enlarged detail view of the valve-seat of the emergency-valve. Fig. 10 is an enlarged face (or train-pipe side) view of said valve, as also a back (or reservoir side) view of the same. Fig. 11 is a like back view of the emergency-valve, as also of the graduation-valve seated thereon and edge view of the same, and a cross-section of same on plane *k l*. Fig. 12 is an elevation view of a bridge-piece that holds these valves to seat. Fig. 13 is an enlarged section of the main valve on plane *m n* of Fig. 19, the upper half being viewed in the direction of the arrow and turned upwardly from the observer. Fig. 14 is a plan view of the valve viewed from the same position and similarly turned. Fig. 15 is a like plan, but with the valve viewed in the direction of the arrow of Fig. 20. Fig. 16 is a plan view of the upper half of the valve-casing turned upwardly from the observer, as also a similar plan of the lower half of the casing rotated to the right hand from off the upper half. Figs. 17 and 18 are cross-sections of this valve in on-lap position on the planes *a b* and *e f*. Figs. 19, 20, and 21 are like sections on plane *c d* in the positions of running, emergency, and release. Figs. 22 and 23 are like sections on the plane *g h* in the positions of running and graduation. Figs. 24 and 25 are like sections on plane *i j* in positions of expansion-tank exhaust.

Referring to the views in detail, 1 represents the casing of the valve mechanism; 2, the train pipe connection; 3, the main reservoir connection; 4, the train pipe exhaust, or passage to the atmosphere; 5, the emergency valve; 6, the graduation valve; 7, the piston attached to the latter valve and for operating both said valves; 8, the main or hand-operated valve, and 9 the engineer's handle fixed to and by which the main valve is operated.

The emergency valve 5 (Figs. 8 to 12) is a flat, plate slide-valve, which lies closely on seat 10 between the train pipe and reservoir spaces, being held thereto by reservoir pressure and the shoulders 11, under which the valve slides, of the bridge 12 fixed to the casing. It is provided with passage 13 whereby upon proper movement (Fig. 5) the train pipe and its exhaust pipe are put to communication through ports 14 and 15; also, with graduation passages 16 and 17 normally opening into said train pipe and exhaust ports (Fig. 3); it carries the bevel or wedge block 18 on its back, which wedge in closed position of this valve (Fig. 3) bears against the correspondingly beveled surface 19 on the bridge; and it is bored vertically with holes 20 in which are seated the springs 21, bearing at their lower ends on the valve casing (Figs. 3 to 5) and which serve to insure the valve being held in normal or running position and to return it to such position after emergency action.

The graduation valve 6 is a plate slide-valve, which is seated in a groove 22 in the back of the emergency valve, and fits closely under the wedge block 18 on the latter. It is provided with the graduation passage 23, which is of such location and extent that upon a proper movement of this valve on the emergency valve, the train pipe will be put to graduation exhaust through the graduation passages 16 and 17 piercing the emergency valve. It is slotted at its upper end to engage with the head 24 on the rod 25 of the piston 7; and it bears the lug 26 projecting below and coming in contact with the wedge block 18 on the emergency valve, so that when this valve is lifted to running position the emergency valve will be carried therewith, as in case of the springs under the latter being absent or disabled.

The conical main or hand-operated valve 8 is seated in a correspondingly shaped bore in the casing, and is provided with an axial passage 27, containing the pressure-retaining valve 28 which acts to hold a certain excess above train pipe pressure in the reservoir; which axial passage in running position opens through radial passage 29 to the reservoir port 30 in the casing (Figs. 3, 8, 9 and 23); also, it opens to the train pipe feed and release port 31 through radial passage 32 (Fig. 23); also, through radial passage 33 to the charging pipe 34 openly communicating with the equalizing chamber or tank 35 (Fig. 23); and, through radial passage 36 to the port 37 opening to chamber 39 under the slide valve piston 7 (Fig. 19). This main valve is provided with the peripheral release and emergency passage 40 which is in plane with the reservoir port 41; valve piston port 37, emergency exhaust port 38, and train pipe feed and release port 31 (Figs. 19 to 21), and has an angular extent adapting it upon suitable movement of the valve to put said ports 37 and 38 to communication, as also said ports 31 and 41; also, it is provided with peripheral passage 42 adapted to put pipe 34 and the equalizing tank 35 to communication with pipe 43 leading to the expansion tank 44 (Fig. 22); and, with a similar passage 45 adapted to put the expansion tank pipe 43 to communication with the port 46 leading to the slide-valve piston chamber 39, as also to put pipe 43 to communication with the exhaust port 47 opening through the casing to atmosphere (Figs. 24 and 25).

The chamber 48 above the slide valve piston 7 is in open communication with the train pipe through the passage 49 (Figs. 3 to 5). 50 (Fig. 1) is a movable piston or abutment that separates the equalization and expansion tanks or chambers 35 and 44, the rod 51 of which piston is rotatably held in the stuffing box 52 and screws into an internally threaded lug 53 on the piston. Turning the rod, as by its nut shaped outer end, will move the piston to effect a relative variation of the interior size of the said tanks.

At the running position, air from the main reservoir enters to the axial passage of the main valve and passing the retaining valve therein issues to the train pipe, to the equalizing tank, to the chamber below the slide valve piston, and from the train pipe to the chamber above said piston, the expansion tank being empty or containing air at atmospheric pressure.

When it is desired to make a graduation application, the engineer will turn the main valve to graduation position, whereupon the equalizing tank will be closed from communicating with the train pipe and will be opened, together with the lower piston chamber, to the expansion tank which also will be held closed to the atmosphere, and the equalization of pressure between these three chambers will cause the piston, under train pipe pressure, to be depressed so as to move the graduation valve to exhaust. This movement of this valve is limited by the emergency valve, which is held strongly to seat by its lifting springs and the reservoir pressure. Immediately upon effecting equalization between the three chambers, and which is practically an instantaneous act, the main valve may be turned to position to exhaust the expansion tank, the equalizing tank at the same time being severed therefrom. When the train pipe pressure has been reduced to or nearly to the reduced pressure under the piston, the latter will be returned to running position by the conjoint action of such reduced pressure and the reservoir pressure acting upwardly on the stem of the piston. The engineer can then return his hand valve to on lap or running position, as the case demands, in either of which positions train pipe air is admitted under the piston. If a second graduate application be required, the valve should be returned to on lap, which recharges the piston chamber, and then to repeated graduation. If for any reason it be desired, during train pipe exhaust, to stop the same this can be accomplished by at once returning to on lap.

It is to be noted that the equalizing tank is in the nature of an extension of the piston chamber, and that the expansion tank is a fixed, non-adjustable or positively prescribed space into which the piston chamber air expands to a certain and defined degree not under the immediate control of the engineer. Thus, though a train pipe exhaust can be stopped while exhaust is going on, it cannot be extended or added to beyond the amount indicated by the size of the expansion tank. With the ordinary engineer's valve mechanism, and especially with the type capable of continuous graduation action to full application, a common tendency is to overgraduate, which results in too quick stops and not unusually the necessity for release and re-application. With the present mechanism the application power can be augmented even to full application power, but only by a series of steps easily and certainly performed without the use of gages or the need of special care, and which steps are unchangeably defined to prevent over graduation. In the common air brake system, over graduation is likely to bring on an emergency application, which with the present mechanism cannot result.

When it is desired to effect an emergency application, the engineer's handle will be turned to the emergency position, at which the lower piston chamber is fully opened to the atmosphere, and thus full train pipe pressure is instantly exerted upon the piston to cause it to depress the emergency valve and open the train pipe wide to the atmosphere. However slowly or incompletely the handle may be moved, so long as the emergency port is opened, even if only momentarily or partially, this suffices to free the piston of sustaining pressure, and the further action, being automatic, is full, quick and cannot be inteferred with through error or inattention. Upon turning the engineer's handle to release position, the lower piston chamber is first charged from the reservoir and the piston raised to close the train pipe if it be not raised by the emergency valve springs, and thereafter the train pipe is put to full communication with the reservoir. It is intended, however, that said spring shall return the valve and piston to running position as soon as the train pipe be exhausted; and in cases where it is desired to retain a certain train pipe pressure, these springs will have a tension adapted to close the pipe when such pressure is reached.

The interior space of the expansion chamber can be readily changed or adjusted by the movable piston in the same, whereby to proportion the same to the valve piston chamber and the desired quantity of a single graduation exhaust action.

In another application, Serial No. 529,369, pending concurrently herewith I have shown and claimed an emergency exhaust valve, and valve piston operated by reservoir air maintained on its opposite faces when in running position.

What is claimed as new is—

1. In combination in an engineer's valve mechanism, a graduation slide-valve located between the train pipe and main reservoir and having maintained reservoir pressure upon one side thereof to hold the same on its seat, a piston movable by a variation of air pressures upon its opposite faces which is connected to and for operating said valve, and a hand valve acting upon suitable movement to effect said variation of pressure, substantially as set forth.

2. In combination in an engineer's valve mechanism, a valve controlling an exhaust port from the train pipe, a piston attached to said valve and normally sustained by train pipe pressure on one of its faces and by train pipe and maintained reservoir pressure on the other of its faces, and a hand valve acting upon suitable movement to effect a variation between said pressures and thereby open or close said valve, substantially as set forth.

3. In combination in an engineer's valve mechanism, a valve controlling the train pipe graduation exhaust, a valve controlling the emergency exhaust of the same, a piston movable by variation of air pressures upon its opposite faces to operate said valves, and a hand valve acting upon suitable movement to effect said variation, substantially as set forth.

4. In combination in an engineer's valve mechanism, two valves controlling one the graduation and one the emergency train pipe exhaust port, the former being seated and movable on the other, a piston movable by variation of air pressures on opposite faces and connected to the graduation valve, means whereby the valve is moved on the other valve to produce a graduation exhaust and both valves are moved together to effect an emergency exhaust, and a hand valve acting upon suitable movement to effect said variation of pressure, substantially as set forth.

5. In combination in an engineer's valve mechanism, an emergency valve normally held closed by a spring, a valve movable thereon to effect a graduation exhaust, a piston movable by variation of train pipe pressure on its opposite faces and attached to said graduation valve and adapted to come into operable contact with said emergency valve, and a hand valve acting by suitable movement to effect said variation of pressure, substantially as set forth.

6. In combination in an engineer's valve mechanism, a valve controlling the emergency exhaust port and one controlling the graduation exhaust port and movably seated on the other, a piston acting upon the graduation valve independently of the other and upon both valves together to open said ports, an open passage from the train pipe to one side of said piston, and a valve controlling a passage from the reservoir to the other side of said piston and therefrom to an exhaust port, substantially as set forth.

7. In combination with a train pipe and a graduation valve controlling an exhaust port therefrom and actuated by variation of train pipe pressures controlling the same, a closed tank or chamber which is arranged to be normally in open communication with the train pipe, valve mechanism acting to disconnect said tank from the train pipe and to reduce the pressure of the train pipe air held therein, and valve mechanism acting to put said graduation valve in communication with said tank for the purpose of actuating the valve to effect a graduation exhaust from the train pipe, substantially as set forth.

8. In combination with a train pipe and an air exhaust valve controlling the same and having a piston operatively connected thereto and actuated by a variation of train pipe pressures on its opposite faces, a closed chamber or tank, a valved passage from one side of said piston to said tank whereby said variation can be effected and positively limited by the piston air expanding into the tank, substantially as set forth.

9. In combination with the train pipe of an air brake mechanism and a chamber or tank normally in open communication therewith, a second chamber or tank normally containing air at atmospheric pressure, means for putting said tanks to open communication and closing them against feed to or exhaust therefrom whereby the expansion of their contained air is automatically defined, a train pipe exhaust valve and means for applying the said expanded air thereto for regulating the exhaust action of the same, substantially as set forth.

10. In combination with the train pipe of an air brake mechanism and with a chamber or tank normally in communication therewith, a second tank normally disconnected from the mechanism, a train-pipe exhaust valve and operatively connected piston having air pressure on its opposite faces, and a hand valve provided with passages adapting the same upon suitable movement to close the said tanks and put the same to open communication with the air on one face of said piston, substantially as set forth.

11. In combination with the train pipe of an air brake, a chamber or tank normally in open communication therewith, a second chamber or tank normally containing air at atmospheric pressure, means for putting said tanks to open communication and closing them as to feed or exhaust, and a train pipe exhaust valve opening by train pipe pressure and controlled and closed by the reduced pressure in one of said tanks, for the purpose set forth.

12. In combination in an engineer's valve mechanism, a graduation exhaust valve and an emergency exhaust valve, a piston connected with and for opening said valves by a variation of air pressures on its opposite faces, a chamber or tank normally containing atmospheric or less than train pipe pressure, and a hand valve operating to expand the air on one side of said piston into said tank to effect a partial movement of said piston and the opening of said graduation valve, and also operating to exhaust the expanded air to effect a further movement of the piston and the opening of the emergency valve, substantially as set forth.

EDWARD G. SHORTT. [L. S.]

Witnesses:
JOHN UNSER,
H. B. EDMONDS.